Dec. 29, 1931.  W. H. FILKINS  1,838,817
TIRE RIM
Filed Oct. 25, 1930  2 Sheets-Sheet 1

Inventor
Wm. H. Filkins
By Clarence A. O'Brien
Attorney

Dec. 29, 1931. W. H. FILKINS 1,838,817
TIRE RIM
Filed Oct. 25, 1930 2 Sheets-Sheet 2
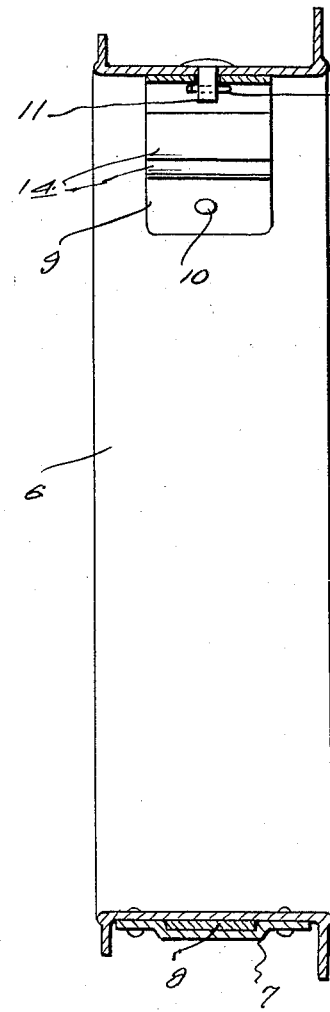
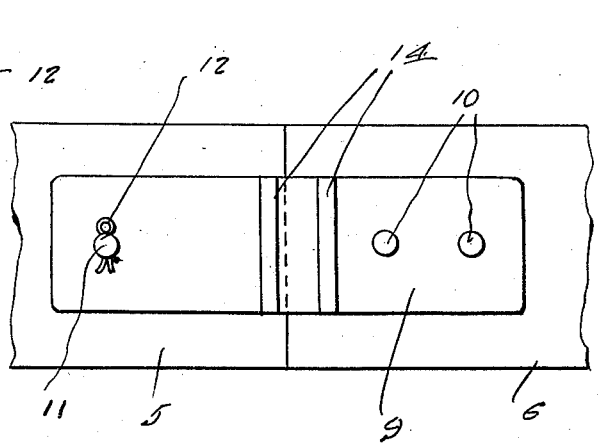
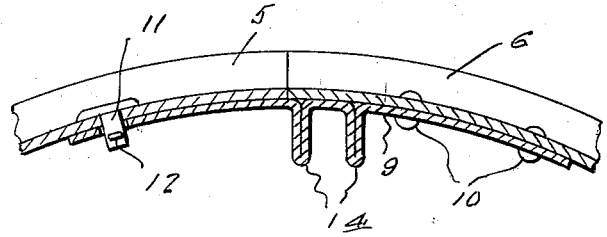
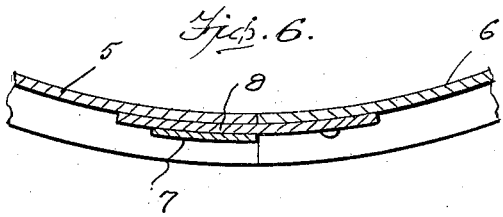
Inventor
Wm. H. Filkins
By Clarence A. O'Brien
Attorney Patented Dec. 29, 1931

1,838,817

UNITED STATES PATENT OFFICE

WILLIAM H. FILKINS, OF CENTRALIA, ILLINOIS

TIRE RIM

Application filed October 25, 1930. Serial No. 491,291.

The present invention relates to a tire rim and has for its prime object to provide a sectional rim with means connecting the sections together which permits of easy assembly and disassembly of said sections for the purpose of assembling the tire thereon and taking the tire therefrom.

Another very important object of the invention resides in the provision of a sectional tire rim of this nature which is exceedingly simple in construction, inexpensive to manufacture, thoroughly efficient and reliable in use, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 3 is a transverse section therethrough,

Figure 4 is a detail view of one connection,

Figure 5 is a longitudinal section therethrough, and

Figure 6 is a longitudinal section through the other connection.

Figures 1, 2:
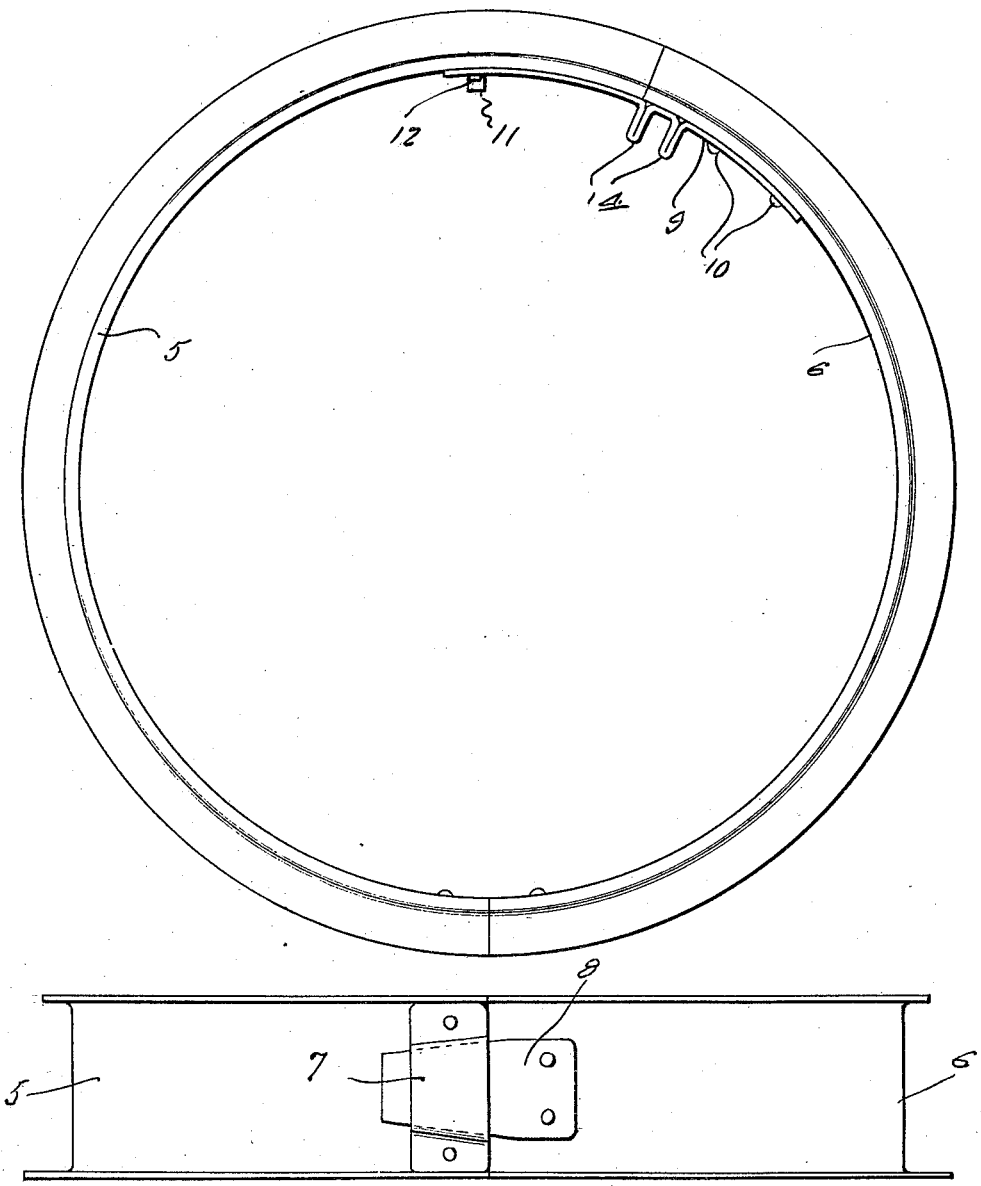
Figure 1 is a side elevation of a rim embodying the features of my invention.
Figure 2 is a plan view thereof.

Referring to the drawings in detail it will be seen that the rim is formed in two sections 5 and 6, the former being slightly larger than the latter. Adjacent ends of the sections 5 and 6 are connected together by a pocket forming strap 7 on the outside of one end of the section 5 to receive a tapered member 8 fixed to the outside of the adjacent end of the section 6.

A sheet metal member 9 is riveted or otherwise secured as at 10 to the inside of the other end of the section 6 and projects beyond said other end to extend within the adjacent end of the section 5 and has an opening through which a pin 11 projecting inwardly from the section 5 is received and a cotter pin or other locking device 12 may be utilized to prevent accidental detachment of the member 9 from the pin 11.

Intermediate portions of the member 9 have spaced inwardly directed extensions 14 for straddling a cross member in the felly of the wheel to prevent circumferential movement of the rim on the felly as will be appreciated. The projections 14 are formed by bending the plate upon itself as shown in Figure 5 and this formation of the projections facilitates the bending of the plate to release its free end from the stud and to place said free end over the stud.

Now to take a tire off the rim, the cotter pin 12 is removed, and the free end of the member 9 is pried off of the pin 11 and the end of the section 6 on which the member 9 is fastened is moved inwardly under the adjacent end of the section 5 and then the section 6 is moved circumferentially in a counter clockwise direction to withdraw the tapered member 8 from the pocketed member 7. To assemble the sections, of course, the operation is reversed.

From the above detailed description it is thought that the construction, ease of operation and advantages of this invention will now be quite apparent to those skilled in this art without a more detailed description thereof.

The present embodiment of the invention has been disclosed in considerable detail merely for the purposes of exemplification, since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A tire rim comprising a pair of sections, one section being longer than the other and one section having a strap connected to the outer face thereof at one end thereof, the strap having a central part of channel shape with the channel tapering inwardly from said rim end and the adjacent end of the other section having a tapered plate fastened thereto for engaging the channel, the opposite end of the last-mentioned section having a plate fastened to its inner face, the plate projecting beyond the end of said section and the adjacent end of the other section carrying a stud, the free end of the last-mentioned plate having and opening therein to receive the stud and said last-mentioned plate having a pair of inwardly extending projections formed by bending the plate upon itself with one of the projections located at the junction of said last named sections ends, said projections engaging a projection on a wheel felly, and facilitating the bending of the plate to release its free end from the stud and to place said free end over the stud.

In testimony whereof I affix my signature.

WILLIAM H. FILKINS.